(12) United States Patent
Stolzman et al.

(10) Patent No.: US 6,499,721 B2
(45) Date of Patent: Dec. 31, 2002

(54) BULK CONTAINER VALVE

(75) Inventors: Michael D. Stolzman, Lake Forest, IL (US); Leszek T. Gawronski, Johnsburg, IL (US)

(73) Assignee: Michael Stolzman, Lake Forest, IL (US)

( * ) Notice: Subject to any disclaimer, the term of this patent is extended or adjusted under 35 U.S.C. 154(b) by 0 days.

(21) Appl. No.: 09/781,734

(22) Filed: Feb. 12, 2001

(65) Prior Publication Data

US 2002/0109119 A1 Aug. 15, 2002

(51) Int. Cl.⁷ .................................................. F16K 5/06
(52) U.S. Cl. ..................... 251/309; 251/144; 137/797
(58) Field of Search ................................ 251/309, 312, 251/315.11, 315.12, 90, 904, 144; 137/797

(56) References Cited

U.S. PATENT DOCUMENTS

| | | | | |
|---|---|---|---|---|
| 4,073,314 A | * | 2/1978 | Speelman et al. | 251/288 X |
| 4,778,152 A | * | 10/1988 | Logman | 251/310 |
| 4,794,944 A | * | 1/1989 | Henry | 251/309 X |
| 4,809,949 A | * | 3/1989 | Rakieski | 251/312 X |
| 4,927,116 A | * | 5/1990 | Schwarz et al. | 251/312 X |
| 5,031,876 A | * | 7/1991 | Giacomini | 251/312 |
| 5,046,523 A | * | 9/1991 | Horhota | 251/309 X |
| 5,704,590 A | * | 1/1998 | Pfeiffer | 251/309 X |

* cited by examiner

*Primary Examiner*—Henry C. Yuen
*Assistant Examiner*—Eric Keasel
(74) *Attorney, Agent, or Firm*—Wood, Phillips, Katz, Clark & Mortimer

(57) ABSTRACT

There is disclosed herein a bulk container valve for use with a bulk container having a tubular spout. The valve comprises a one piece plastic housing having an interior chamber connecting a front port to a rear port. The housing includes a rear fitting about the rear port for connection to the spout, in use, and a front fitting about the front port. A one piece plastic cylindrical valve element is rotationally supported in the interior chamber of the housing for movement between a valve open position and a valve closed position. The valve element includes a handle for selective rotation of the valve element. A collar secures the valve element to the housing to maintain the valve in assembled condition.

16 Claims, 4 Drawing Sheets

BULK CONTAINER VALVE

FIELD OF THE INVENTION

This invention relates to intermediate bulk storage containers and, more particularly, to an improved bulk container valve for use therewith.

BACKGROUND OF THE INVENTION

For shipment of goods, a storage system known as intermediate bulk container (IBC) has found wide acceptance. The IBC comprises a 275 gallon container mounted to a skid or pallet. A wire mesh cage is also mounted to the skid and surrounds the container on all four sides. The top of the container is generally exposed. Additional pallets or IBC's may then be stacked for shipping and storage.

The IBC is filled at its top by removing a cover providing access to an opening. A bottom spout acts as an outlet for goods stored in the container. A bulk container valve is typically removably secured to the IBC to control removal of goods from the container. Typically the valve is threaded onto the spout. A hose can then be connected to the valve with a cam lever coupling to empty the contents of the IBC.

A typical cylindrical IBC valve comprises a plastic housing with a cylindrical valve element contained within the housing. A handle attaches to the cylindrical valve element. Typically, the handle is secured to the valve element with an external bolt. However, such a bolt can be easily removed, causing the handle to fall off. As is apparent, without the handle the valve would be extremely difficult to operate.

To maintain the valve element within the plastic housing, an arc shaped metal clip engages the shoulder of the housing and a top surface of the valve element. Therefore, the valve consists of three elements, the valve element, a handle, and a clip. This can increase assembly time of the valve.

Typically, a seal is disposed between the valve element and valve housing to prevent fluid leakage. More specifically, an O-ring seal is disposed between the valve element sidewall and the interior wall of the chamber. During service, the valve may be deformed, such as when a laborer inadvertently steps on the valve handle while accessing adjacent containers. This deformation may lead to the escape of fluid past the O-ring seal and out of the valve.

The present invention is directed to solving one or more of the problems discussed above in a novel and simple manner.

SUMMARY OF THE INVENTION

In accordance with the invention there is provided a bulk container valve in which the valve element and handle are formed of one piece.

Broadly, there is disclosed herein a bulk container valve adapted for use with a bulk container having a tubular spout. The valve comprises a one piece plastic housing having an interior chamber connecting a front port to a rear port. The housing includes a rear fitting about the rear port for connection to the spout, in use, and a front fitting about the front port. A one piece cylindrical valve element is rotationally supported in the interior chamber for movement between a valve open position and a valve closed position. The valve element includes a handle for selective rotation of the valve element. Securing means for securing the valve element to the housing to maintain the valve in assembled condition are provided.

It is a feature of the invention that the valve includes a sealing plug insertable into the valve element to prevent fluid leakage from within the valve element.

It is another feature of the invention that the securing means comprises a collar having a radially inwardly directed flange.

It is yet another feature of the invention that the valve further comprises a stop on the valve element extending radially outwardly and abutting an arc shaped guide formed within the housing for limiting rotational movement of the handle.

It is a further feature of the invention that the valve comprises a tamper evident pin insertable through rotationally aligned openings formed within each of the housing and the valve element and that the pin is aligned along the radial direction of the cylindrical valve element.

In accordance with another aspect of the invention there is disclosed a bulk container valve comprising a one piece plastic housing having a cylindrical sidewall, a closed bottom end and an open top end forming an interior chamber, the sidewall including a front port and an opposed rear port, the front port having a front fitting and the rear port having a rear fitting for connection to the spout, in use. A generally cylindrical one piece plastic valve element having a proximal and distal end, the distal end being insertable through the open top end of the housing and rotationally supported in the interior chamber, the proximal end including a handle for selective rotation of the valve element between a valve open position and a valve closed position is included. Securing mean for securing the valve element within the interior chamber of the housing is included.

It is a feature of the invention that the securing means comprises a collar having a radially inwardly directed flange, the collar being threadably securable to the housing.

It is another feature of the invention that the valve comprises an O-ring sealing means disposed between adjacent annular surfaces of the housing and the valve element such that radial expansion and contraction of the valve housing and valve element during ovalization does not interrupt the sealing means.

In accordance with yet another aspect of the invention there is disclosed a bulk container valve comprising a one piece plastic housing having an interior chamber connecting a front port to a rear port, the housing including a rear fitting about the rear port for connection to the spout, in use, and a front fitting about the front port. A plastic cylindrical valve element is rotationally supported in the interior chamber of the housing for movement between a valve open position and a valve closed position, the valve element having a handle attached thereto for selective rotation of the valve element is included. Securing means for securing the valve element to the housing comprises a collar threadably attached to the housing. The collar includes a radially inwardly extending flange having a face abutting a surface of the valve element to maintain the valve in an assembled condition.

It is a feature of the invention that the valve element and handle are one piece.

It is another feature of the invention that the collar has an annular surface including regularly spaced protrusions, the surface being engageable with a corresponding surface of the housing during assembly of the valve.

It is another feature of the invention that the valve further comprises a stop on the valve element extending radially outwardly and abutting an arc shaped guide formed within the housing for limiting rotational movement of the handle.

It is yet another feature of the invention that the valve further comprises an O-ring sealing means disposed between adjacent annular surfaces of the housing and the valve element such that radial expansion and contraction of the valve element during ovalization does not interrupt the sealing means.

It is yet a further feature of the invention that the plastic housing is made of propylene.

Further features and advantages of the invention will be readily apparent from the specification and from the drawing.

DETAILED DESCRIPTION OF THE INVENTION

Figure 1:
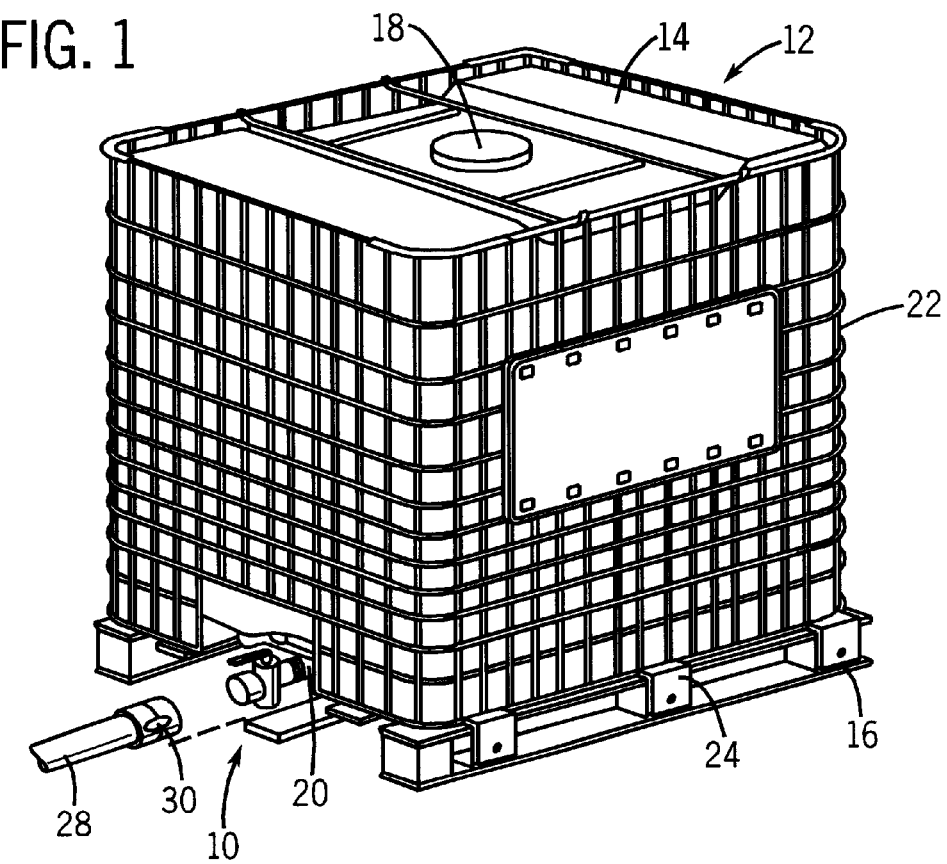
FIG. 1 is a perspective view of an intermediate bulk container (IBC) including a valve according to the invention.

Referring to FIG. 1, a bulk container valve 10 according to the invention is illustrated mounted to an intermediate bulk container (IBC) 12. The IBC 12 comprises a 275-gallon plastic container 14 resting on a pallet or skid 16. The container 14 can be filled at its top as by removing a cover 18 providing access to an opening (not shown). A bottom spout 20 acts as an outlet for goods stored in the container 14. The container 14 is surrounded on all four sides by a wire mesh cage 22. The cage 22 is secured to the pallet 16 using brackets 24.

Figure 3:
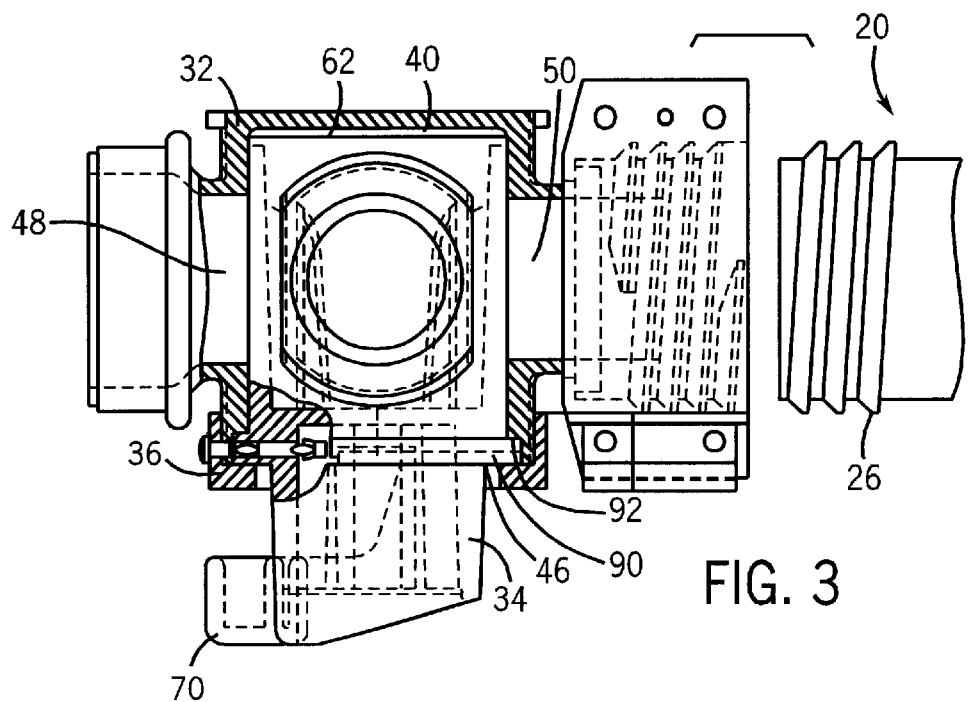
FIG. 3 is a side sectional view of the valve of FIG. 2.

As illustrated in FIGS. 1 and 3, the spout 20 is a tubular spout including an external thread 26. The valve 10 is adapted to be threadably connected to the spout 20. A hose 28 includes a cam lever coupling element 30 for securing the hose 28 to the valve 10 in a conventional manner. As described, the valve 10 is selectively operated to empty the contents from the container 14 to the hose 20 for ultimate disposition.

Figure 2:
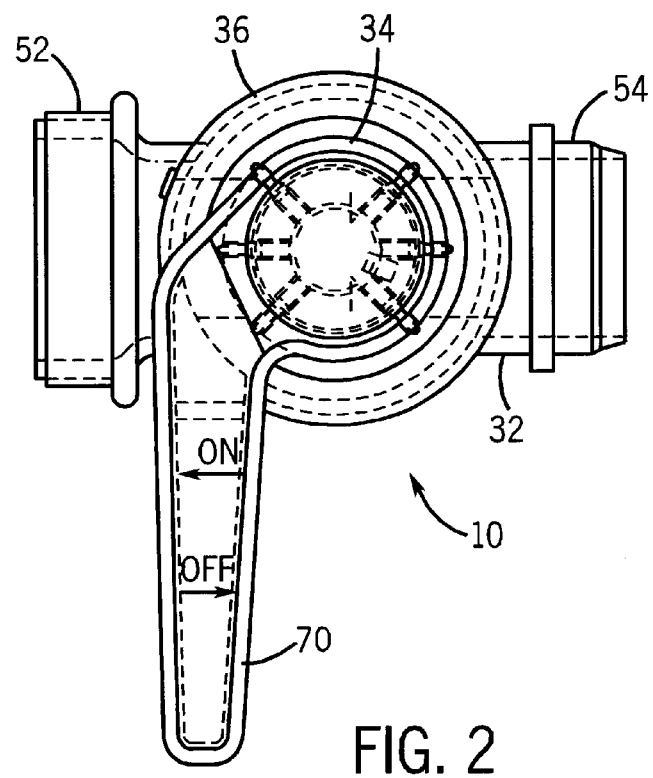
FIG. 2 is a top plan view of the valve according to the invention.

With reference to FIGS. 2 and 3 the valve 10 comprises a one piece plastic housing 32, a one piece plastic valve element 34, and a collar 36. More specifically, the valve element 34 is rotationally supported in the housing 32 by the threadable collar 36 for movement between a valve open position and a valve closed position.

Figure 4:
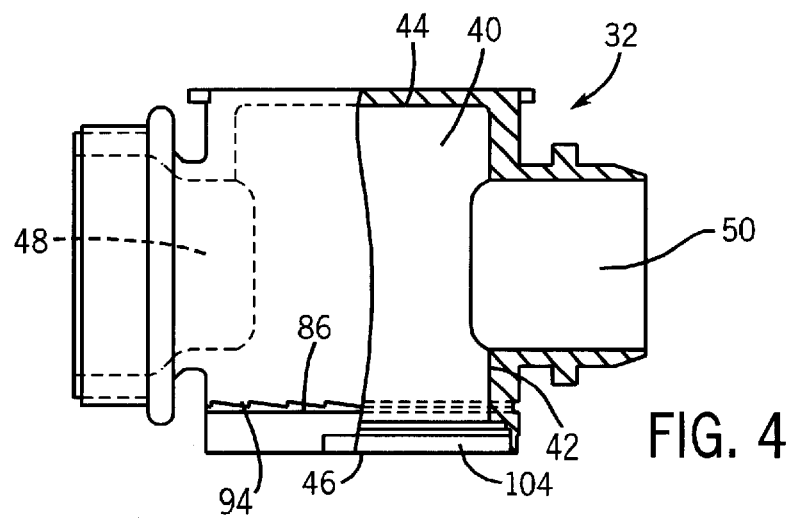
FIG. 4 is a side sectional view of the valve housing according to the invention.
Figure 5:
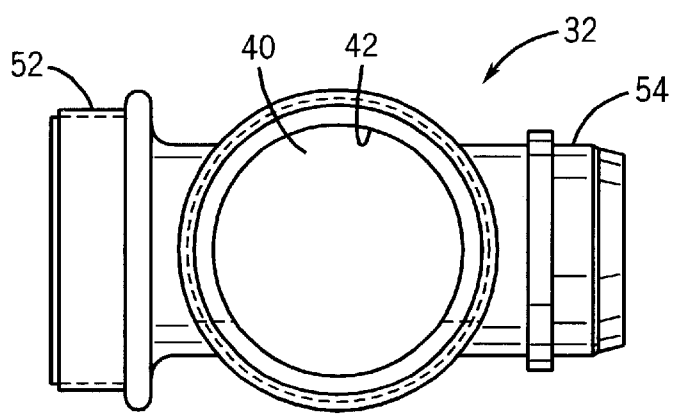
FIG. 5 is a top elevation view of the valve housing according to the invention.

Turning now to FIGS. 4 and 5 the one piece plastic housing 32 comprises an upright cylindrical interior chamber 40 having a sidewall 42, a closed bottom end 44, and an open top end 46. A front port 48 connects to the sidewall 42, and a rear port 50 connects to the sidewall 42 oppositely of the front port 48. For simplicity herein, the longitudinal end of the valve 10 furthest from the IBC 12, in use, is referred to as the front portion, while the opposite end closest to the IBC 12 is referred to as the rear portion. A front fitting 52 about the front port 48 connects, in use, to the hose 28 (see FIG. 1) while a rear fitting 54 about the rear port 50 connects to the tubular spout 20 of the IBC 12. More specifically, the rear port 50 includes a shoulder flange 56 which acts to retain a threadable collar 58. The threadable collar 58, in turn, connects to the tubular spout 20.

Figure 6:
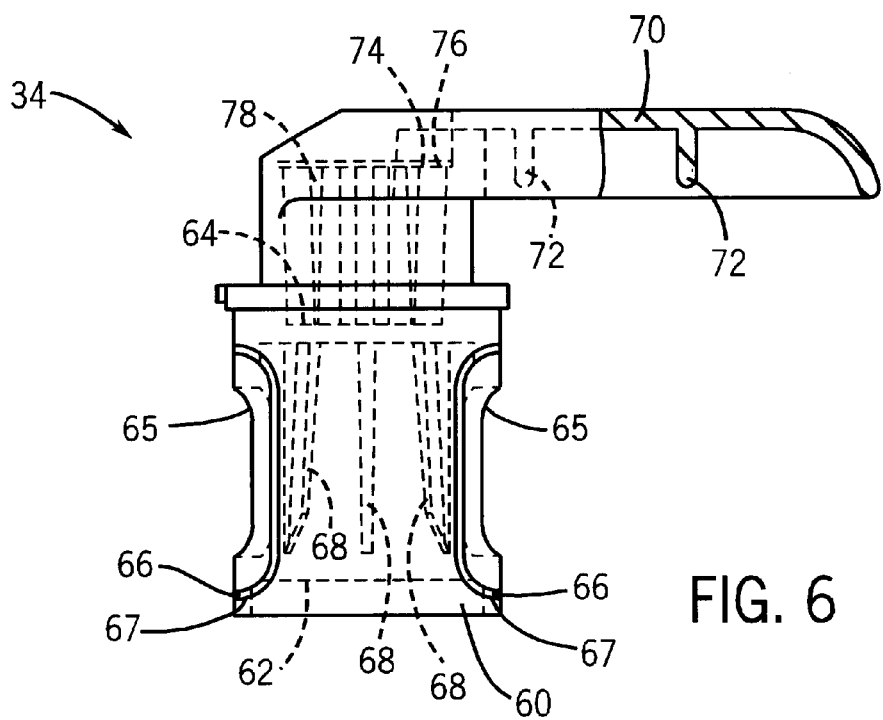
FIG. 6 is a side sectional view of the valve element according to the invention.
Figure 7:
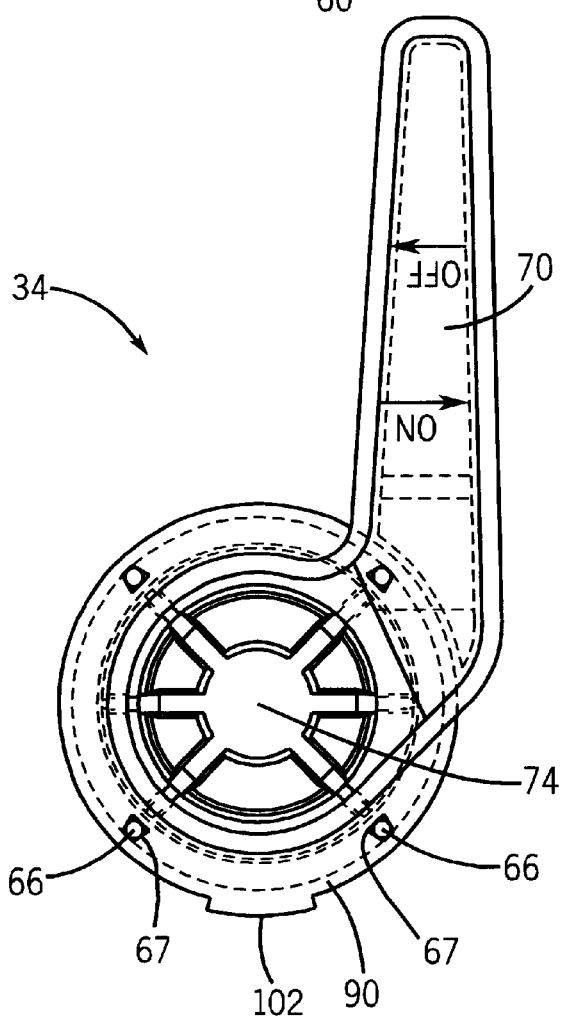
FIG. 7 is a top elevation view of the valve element according to the invention.

The valve element 34 is of one piece plastic as shown in FIGS. 6 and 7. More specifically, the valve element 34 is generally cylindrically shaped comprising a cylindrical sidewall 60, a closed bottom end 62, and an open top end 64. The sidewall 60 includes two oppositely disposed openings 65 defining an interior passage in which fluid may flow therethrough while the valve element 34 is in a valve open position. O-rings 66 lock into annular grooves 67 along the perimeter of the openings 65 so as to prevent fluid leakage about the openings 65. Due to the injection molded fabrication of the valve element 34, the top end 64 is open to permit mold separation. Longitudinally aligned ribs 68 extend along the interior of the sidewall 60 and connect to a generally perpendicularly aligned handle 70. The ribs 68 effectively increase the stiffness of the valve element 34 while allowing for reduced sidewall thickness and easy mold separation. Likewise, ribs 72 within the handle 70 increase torsional stiffness while requiring less material for fabrication. A sealing plug 74 must be inserted into the open top end 64 of the valve element 34 to prevent fluid leakage the from within the valve element 34. The sealing plug 74 snaps into a groove 76 within the interior of the sidewall 60 and rests upon a top flat surface 78 of the ribs 68. The sealing plug 74 is typically made of VITON® and may be color coded to indicate the fluid contained within the IBC 12.

Figure 8:
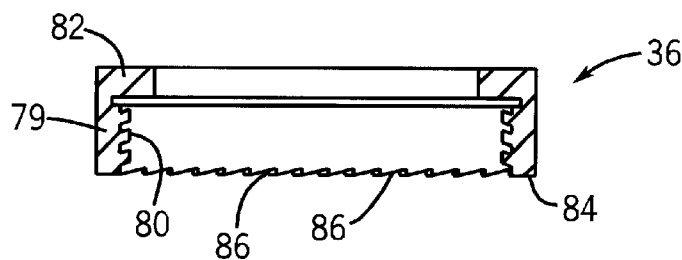
FIG. 8 is a side sectional view of the collar according to the invention.
Figure 9:
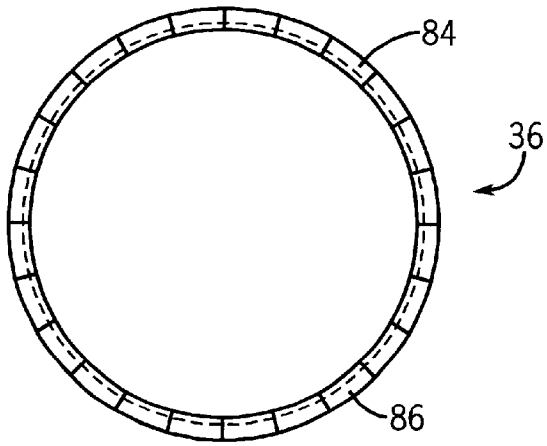
FIG. 9 is a top elevation view of the collar according to the invention.

The collar 36 is made of plastic and comprises a cylindrical sidewall 79 having internal threads 80, the sidewall 79 connecting to a radially inwardly directed flange 82 as illustrated in FIGS. 8 and 9. A bottom edge 84 of the sidewall 79 includes regularly spaced teeth 86 for securing the collar 36 to the housing 32.

Figure 10:
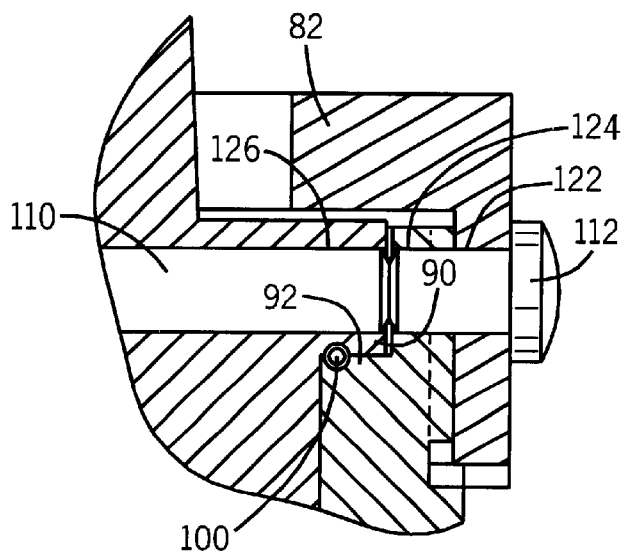
FIG. 10 is an exploded side sectional view of the tamper evident pin according to the invention.

With reference to FIG. 3, assembly of the valve 10 is simple. First, the closed end 62 of the valve element 34 is placed into the open end 46 of the housing 32. The valve element 34 is then inserted fully into the interior chamber 40 of the housing 32 until a shoulder flange 90 of the valve element 34 abuts an annular ledge 92 on the open end 46 of the housing 32. The collar 36 is then placed over the handle 70 and is threadably attached to external threads (not shown) of the housing 32. The teeth 86 of the collar 36 are engageable with corresponding teeth 94 on the housing 32 (FIG. 4). Once the collar 36 is secured, the valve element 34 is fully supported within the housing 32 so that the handle 70 may be used for movement of the valve element 34 between a valve open position (shown in FIG. 6) and a valve closed position. Fluid leakage is prevented by the O-ring seals 66 about the openings 65 and additionally by an O-ring seal 100 disposed between the shoulder flange 90 of the valve element 34 and the annular ledge 92 of the housing 32 as illustrated in FIG. 10. The O-ring seal 100 is located such that radial expansion and contraction of the valve housing 32 and element 34, the so called ovalizing which may be caused by a laborer stepping on the handle 70 of the valve 10, does not allow fluid to escape the valve 10. Furthermore, the collar flange 82 provides a greater radial stiffness to the valve 10 and reduces ovalization of the valve element 34 and housing 32.

In the valve open position the openings 65 are aligned with the front port 48 and rear port 50. In the valve closed position, the openings 65 are oriented in a plane perpendicular to the to the longitudinal axis of the valve 10 so that there is no fluid communication between the front port 48 and the rear port 50.

As shown in FIGS. 4 and 7, the valve element 34 also includes an arc shaped flange 102 extending outwardly from the shoulder flange 90. The arc shaped flange 102 abuts an arc shaped guide 104 formed within the housing 32 to act as a stop for the valve element 34, allowing the valve element 34 to only rotate between the valve open and valve closed positions.

Figure 11:
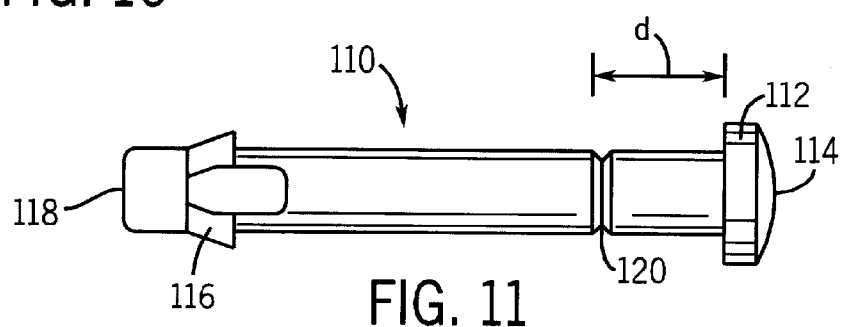
FIG. 11 is a side elevation view of the tamper evident pin of FIG. 10.

In order to keep the valve element 34 in the closed position during shipment, a tamper evident pin 110 may be used as shown in FIGS. 10 and 11. The pin 110 includes a head 112 at a proximal end 114 and a retainer 116 at a distal end 118. A circumferential groove 120 is located at a distance d from the head 112. The pin 110 is inserted into radially aligned openings 122, 124, and 126 in the collar 36, housing 32, and valve element 34 respectively. The openings 122, 124, and 126 are in alignment in the valve closed position so that the pin 110 prevents the valve element 34 from rotating from the valve closed position. The retainer 116 acts to hold the pin 110 within the openings, and the tamper evident retainer 116 must be broken if the pin 110 is to be removed from within the openings 122, 124, and 126. The circumferential groove 120 allows for easy shearing of the pin so that the valve element 34 may be, after some resistance, rotated to a valve open position. Clearly, a broken pin 110 indicates that the valve element 34 has been rotated away from the valve closed position. Once the pin 110 breaks along the groove 120, the proximal end 114 may be removed from the openings 122 and 124 by gripping the head 112, while the distal end 118 of the pin 110 remains within the valve element 34 until another pin (not shown) is subsequently inserted into the openings 122,124, and 126. Eventually, the distal end 118 will be pushed out of the valve 10 through openings (not shown) located radially opposite the openings 122, 124, and 126.

Thus, the bulk container valve 10 provides substantial improvements over the prior art bulk container valves.

We claim:

1. A bulk container valve adapted for use with a bulk container having a tubular spout, the valve comprising:
    a one piece plastic housing having an interior chamber connecting a front port to a rear port, the housing including a rear fitting about the rear port for connection to the spout, in use, and a front fitting about the front port;
    a one piece plastic cylindrical valve element rotationally supported in the interior chamber of the housing for movement between a valve open position and a valve closed position, the valve element including a handle for selective rotation of the valve element; and
    securing means threadably secured to the housing for securing the valve element in the housing to maintain the valve in assembled condition.

2. The bulk container valve of claim 1 further comprising a sealing plug insertable into the valve element to prevent fluid leakage from within the valve element.

3. The bulk container valve of claim 1 further comprising a stop on the valve element extending radially outwardly and abutting an arc shaped guide formed within the housing for limiting rotational movement of the handle.

4. The bulk container valve of claim 1 wherein the securing means comprises a collar having a radially inwardly directed flange.

5. The bulk container valve of claim 4 wherein the collar is threadably securable to the housing.

6. The bulk container valve of claim 1 further comprising a tamper evident pin insertable through rotationally aligned openings formed within each of the housing and the valve element.

7. The bulk container valve of claim 6 wherein the tamper evident pin is aligned along the radial direction of the cylindrical valve element.

8. A bulk container valve adapted for use with a bulk container having a tubular spout, the valve comprising:
    a one-piece plastic housing having a cylindrical sidewall, a closed bottom end and an open top end forming an interior chamber, the sidewall including a front port and an opposed rear port, the front port having a front fitting and the rear port having a rear fitting for connection to the spout, in use;
    a generally cylindrical one piece plastic valve element having a proximal and distal end, the distal end being insertable through the open top end of the housing and rotationally supported in the interior chamber, the proximal end including a handle for selective rotation of the valve element between a valve open position and a valve closed position; and
    securing means for securing the valve element within the interior chamber of the housing.

9. The bulk container valve of claim 8 further comprising an O-ring seal disposed between adjacent annular surfaces of the housing and the valve element.

10. The bulk container valve of claim 8 wherein the securing means comprises a collar having a radially inwardly directed flange.

11. The bulk container valve of claim 10 wherein the collar is threadably securable to the housing.

12. A bulk container valve adapted for use with a bulk container having a tubular spout, the valve comprising:
    a one piece plastic housing having an interior chamber connecting a front port to a rear port, the housing including a rear fitting about the rear port for connection to the spout, in use, and a front fitting about the front port;
    a one piece plastic cylindrical valve element rotationally supported in the interior chamber of the housing for movement between a valve open position and a valve closed position, the valve element having a handle attached thereto for selective rotation of the valve element; and
    securing means for securing the valve element to the housing comprising a collar threadably attached to the housing and having a radially inwardly extending flange, the flange having a face abutting a surface of the valve element to maintain the valve in assembled condition.

13. The bulk container valve of claim 12 further comprising an O-ring seal disposed between adjacent annular surfaces of the housing and the valve element.

14. The bulk container valve of claim 12 wherein the valve element and handle are one piece.

15. The bulk container valve of claim of claim 12 wherein the collar has an annular surface including regularly spaced protrusions, the surface being engageable with a corresponding surface of the housing during assembly of the valve.

16. The bulk container valve of claim 12 further comprising a stop on the valve element extending radially outwardly and abutting an arc shaped guide formed within the housing for limiting rotational movement of the handle.

* * * * *